United States Patent
Fei (10) Patent No.: US 9,369,772 B1
(45) Date of Patent: Jun. 14, 2016

(54) DUAL PID CONTROLLER BASED BIT ALLOCATION AND RATE CONTROL FOR VIDEO CODING

(75) Inventor: Wei Fei, Pudong District (CN)

(73) Assignee: MARVELL INTERNATIONAL LTD., Hamilton (BM)

(*) Notice: Subject to any disclaimer, the term of this patent is extended or adjusted under 35 U.S.C. 154(b) by 1079 days.

(21) Appl. No.: 13/090,674

(22) Filed: Apr. 20, 2011

Related U.S. Application Data (60) Provisional application No. 61/326,526, filed on Apr. 21, 2010.

(51) Int. Cl.
*H04N 21/6373* (2011.01)
*H04N 19/152* (2014.01)

(52) U.S. Cl.
CPC ....... *H04N 21/6373* (2013.01); *H04N 7/26186* (2013.01)

(58) Field of Classification Search
CPC .................... H04N 7/26186; H04N 21/6373
USPC ........................................ 375/240.01–240.05
See application file for complete search history.

(56) References Cited

U.S. PATENT DOCUMENTS

| | | | |
|---|---|---|---|
| 2005/0254576 A1* | 11/2005 | Huang | 375/240.03 |
| 2007/0206674 A1* | 9/2007 | Ziauddin et al. | 375/240.05 |
| 2009/0010325 A1* | 1/2009 | Nie et al. | 375/240.01 |
| 2010/0195713 A1* | 8/2010 | Coulombe et al. | 375/240.02 |

* cited by examiner

*Primary Examiner* — Tung Vo
*Assistant Examiner* — Rowina Cattungal (57) ABSTRACT

System and methods are provided for encoding a video stream. A video encoder may encode a frame and generate output bits to a buffer. A first PID controller may receive a first error signal and generate a preliminary bit budget for the frame, the first error signal being based on a complexity measure of the frame. A second PID controller may receive the preliminary bit budget, a second error signal and a predetermined bit rate setting, the second error signal being representative of a difference between a target number of bits stored in the buffer and a feedback status of the buffer. The second PID controller may generate a final bit budget for the frame, and provide the final bit budget for the frame to the video encoder.

4 Claims, 9 Drawing Sheets

DUAL PID CONTROLLER BASED BIT ALLOCATION AND RATE CONTROL FOR VIDEO CODING

CROSS-REFERENCE TO RELATED APPLICATIONS

This application claims priority to and benefit from U.S. Provisional Patent Application No. 61/326,526, filed on Apr. 21, 2010, and entitled "Dual PID Controller Based Bit Allocation and Rate Control for Video Coding," the entirety of which is incorporated herein by reference.

FIELD

The technology described in this patent document relates generally to video coding. More particularly, systems and methods are disclosed for bit allocation and/or rate control in video coding.

BACKGROUND

Figure 1:
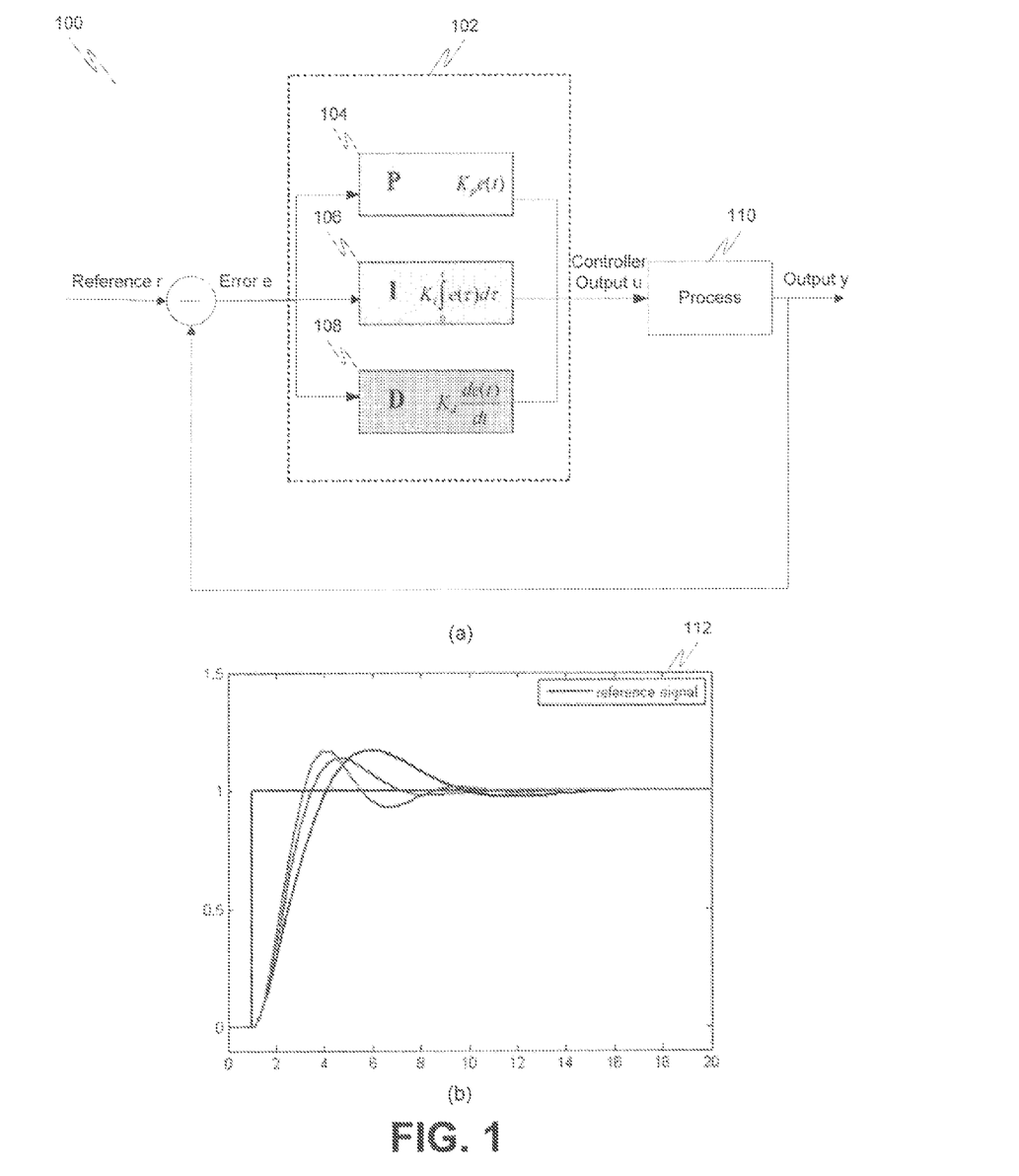
FIG. 1 illustrates an example diagram of a typical PID controller and example output signals of a process controlled by a PID controller with different tuning parameters.

PID controllers are widely used in industry to regulate temperature, pressure, flow rate, chemical composition, speed and practically every other variable for which a measurement exists. FIG. 1 illustrates at 100 an example diagram of a PID controller 102 and example output signals of a process controlled by a PID controller with different tuning parameters. As shown in FIG. 1(a), the purpose of using the PID controller 102 is to make an output y of a process 110 follow a reference value r. To achieve this purpose, the PID controller 102 calculates an error e as the difference between the measured output y and the reference value r and attempts to minimize the error e. The PID controller 102 includes three elements, a proportional element 104, an integral element 106, and a derivative element 108. The three elements produce output values—the proportional, the integral and derivative values, denoted P, I, and D, respectively. These output values can be interpreted in terms of time. P depends on a present error, I depends on the accumulation of past errors, and D is a prediction of future errors, based on a current rate of change.

The traditional basic equation for the PID control scheme is:

$$u(t) = K_p e(t) + K_i \int e(t) d(t) + K_d \frac{d}{dt} e(t)$$

where u(t) is the output of the PID controller 102, $K_p$, $K_i$, $K_d$ are tuning parameters, and e(t) is the error.

Example output signals (y) of the process 110 are shown at 112 in FIG. 1(b). Each curve (except the reference signal) represents an output signal for a particular set of tuning parameters. All output signals of the process 110 oscillate around a reference signal in a decaying sinusoid. Eventually, all output signals converge to the reference signal.

SUMMARY

In accordance with the teachings described herein, system and methods are provided for encoding a video stream using proportional-integral-derivative (PID) controllers. A video encoder may encode a frame in the video stream and generate output bits for the frame to a buffer. A first PID controller may receive a first error signal from the video encoder and generate a preliminary bit budget for the frame based upon the first error signal, the first error signal being based on a complexity measure of the frame. A second PID controller may receive the preliminary bit budget for the frame, a second error signal and a predetermined bit rate setting, the second error signal being representative of a difference between a target number of bits stored in the buffer and a feedback status of the buffer, the feedback status of the buffer indicating an actual number of bits stored in the buffer. The second PID controller may generate a final bit budget for the frame based on the preliminary bit budget for the frame, the second error signal, and the predetermined bit rate setting, and provide the final bit budget for the frame to the video encoder for encoding the frame and generating the output bits for the frame to the buffer.

As further examples, the complexity measure of a current frame to be encoded by the video encoder may be determined based on a difference between a mean absolute difference of the current frame and an average mean absolute difference of the frames encoded by the video encoder previously during a predetermined period, the mean absolute difference of the current frame indicating complexity of the current frame and the average mean absolute difference of the previous frames indicating the average complexity of the previous frames.

As additional examples, the video encoder may determine a quantization parameter for a current frame to be encoded by the video encoder, based on the mean absolute difference of the current frame, the final bit budget for the current frame, the quantization parameter for the frame previously encoded by the video encoder, a mean absolute difference of the previous frame, and output bits for the previous frame. The quantization parameter for the current frame may be determined according to the following equation:

$$Q(t) = \sqrt{\frac{B(t-1)Q^2(t-1)MAD(t)}{T(t)MAD(t-1)}},$$

where t is a time index of the current frame. Q(t) is the quantization parameter for the current frame, MAD(t) is the mean absolute difference of the current frame, T(t) is the final bit budget for the current frame, t−1 is a time index of the frame previously encoded by the video encoder, Q(t−1) is the quantization parameter for the previous frame, MAD(t−1) is the mean absolute difference of the previous frame, and B(t−1) is the output bits for the previous frame. The average mean absolute difference of the previous frames may be determined according to the following equation:

$$avg\,MAD = \frac{1}{F}\sum_{\tau=F}^{t} MAD(\tau),$$

where avg MAD is the average mean absolute difference of the frames in a previous period between t−F and t, τ is a time index, between t−F and t, MAD(τ) is a mean absolute difference of the frame at time τ, and F is the total frame number of the frames encoded previously during the predetermined period.

As further examples, the video encoder may determine a quantization parameter for the frame based on a Rate-Quantization model from a Video CODEC Test Model, Near-Term, Version 8 (TMN8). The predetermined bit rate setting may include a target bit rate in bits per second (R) and a frame rate in frames per second (F). The feedback status of the buffer may be determined based on a previous feedback status of the buffer, output bits for a previous frame, and the predetermined bit rate setting. An arithmetic component may receive a first input signal representative of the target number of bits stored in the buffer and a second input signal representative of the feedback status of the buffer, and generate the second error signal based on the first and second input signals.

As another example, a method is provided for encoding a video stream using proportional-integral-derivative (PID) controllers. A first error signal may be received at a first PID controller, the first error signal being based on a complexity measure of a frame in the video stream to be encoded by a video encoder. A preliminary bit budget for the frame may be generated by the first PID controller based upon the first error signal. A second error signal may be received at a second PID controller, the second error signal being representative of a difference between a target number of bits stored in a buffer and a feedback status of the buffer, the feedback status of the buffer indicating an actual number of bits stored in the buffer. A predetermined bit rate setting may be received at the second PID controller. A final bit budget for the frame may be generated by the second PID controller based on the preliminary bit budget for the frame, the second error signal, and the predetermined bit rate setting. The final bit budget for the frame may be provided to the video encoder for encoding the frame and generating output bits for the frame to the buffer.

As another example, a system for encoding a video stream using proportional-integral-derivative (PID) controllers may include one or more data processors and a computer-readable storage medium encoded with programming instructions for commanding the one or more data processors to perform a method. In the method, a first error signal may be received at a first PID controller, the first error signal being based on a complexity measure of a frame in the video stream to be encoded by a video encoder. A preliminary bit budget for the frame may be generated by the first PID controller based upon the first error signal. A second error signal may be received at a second PID controller, the second error signal being representative of a difference between a target number of bits stored in a buffer and a feedback status of the buffer, the feedback status of the buffer indicating an actual number of bits stored in the buffer. A predetermined bit rate setting may be received at the second PID controller. A final bit budget for the frame may be generated by the second PID controller based on the preliminary bit budget for the frame, the second error signal, and the predetermined bit rate setting. The final bit budget for the frame may be provided to the video encoder for encoding the frame and generating output bits for the frame to the buffer.

As another example, a non-transitory computer-readable storage medium may include programming instructions for causing a processing system to perform a method for encoding a video stream using proportional-integral-derivative (PID) controllers. In the method, a first error signal may be received at a first PID controller, the first error signal being based on a complexity measure of a frame in the video stream to be encoded by a video encoder. A preliminary bit budget for the frame may be generated by the first PID controller based upon the first error signal. A second error signal may be received at a second PID controller, the second error signal being representative of a difference between a target number of bits stored in a buffer and a feedback status of the buffer, the feedback status of the buffer indicating an actual number of bits stored in the buffer. A predetermined bit rate setting may be received at the second PID controller. A final bit budget for the frame may be generated by the second PID controller based on the preliminary bit budget for the frame, the second error signal, and the predetermined bit rate setting. The final bit budget for the frame may be provided to the video encoder for encoding the frame and generating output bits for the frame to the buffer.

DETAILED DESCRIPTION

Figure 2:
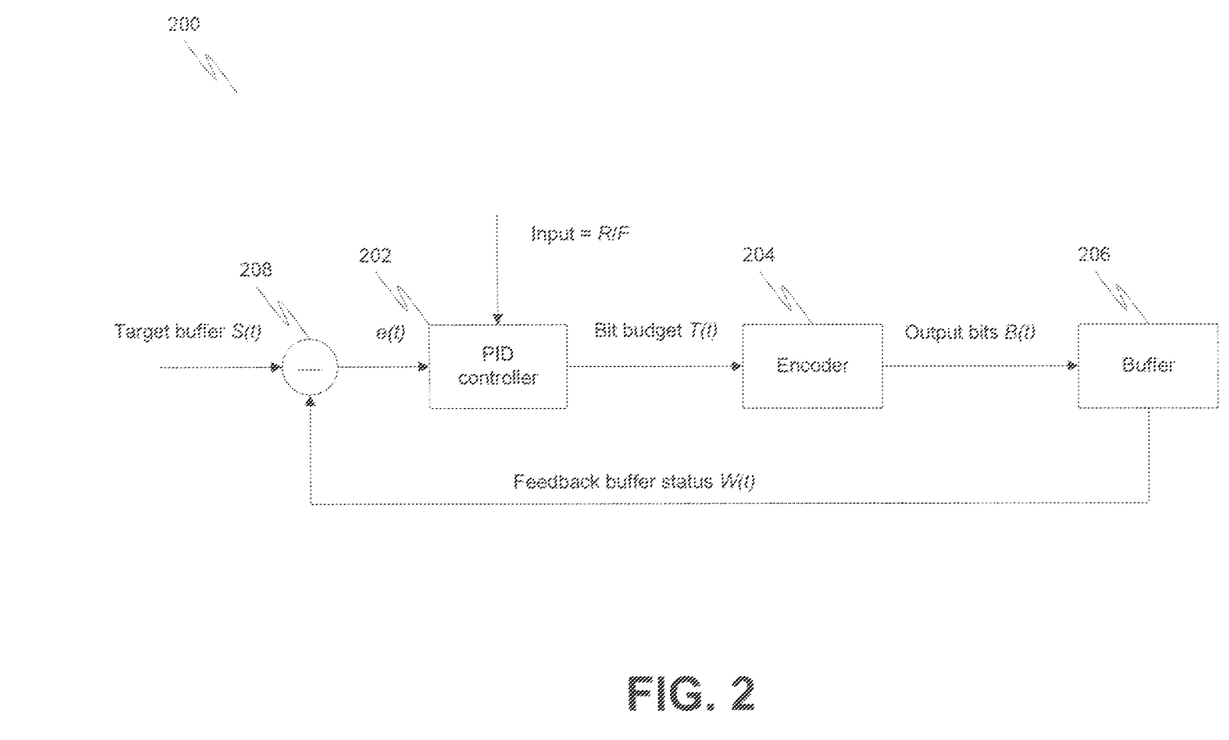
FIG. 2 illustrates an example diagram of single-PID-controller-based bit allocation and rate control for video coding.

FIG. 2 illustrates at 200 an example diagram of single-PID-controller-based bit allocation and rate control for video coding. The PID controller 202 is used in connection with a video encoder 204 for bit allocation and rate control. For example, the PID controller 202 may adjust a bit budget for a frame to be encoded in the video encoder 204 based on the status of a buffer 206, and thus output bits from the video encoder 204 to the buffer 206 may be adjusted so as to achieve a desired bit level in the buffer 206.

A target buffer level S(t) and a feedback buffer status W(t) may be received at an arithmetic component 208, such as a comparator. The feedback buffer status W(t) is updated based on a previous feedback buffer status W(t−1), output bits B(t−1) previously generated from the video encoder 204, and a predetermined bit rate setting that may include a target bit rate (R) in bits per second and a frame rate (F) in frames per second. For example, W(t) may be updated according to an equation:

$$W(t) = W(t-1) + B(t-1) - R/F.$$

An error signal e(t) may be generated at the arithmetic component 208 based on the difference between the target buffer level S(t) and the feedback buffer status W(t). For example, the error signal e(t) may be generated according to an equation:

$$e(t) = S(t) - W(t).$$

The PID controller 202 receives an input R/F determined from the bit rate setting and the error signal e(t), and generates a bit budget T(t) to the video encoder 204 based on the bit rate setting and the error signal e(t). For example, the bit budget T(t) may be generated according to an equation:

$$T(t) = \frac{R}{F}(1 + PID) = \frac{R}{F}\left(1 + K_p e(t) + K_i \sum_{\tau=0}^{t} e(\tau) + K_d [e(t) - e(t-1)]\right)$$

in which PID is the discrete-time version of PID control scheme.

The video encoder 204 may use the bit budget T(t) to encode a current frame, and generates output bits B(t) for the current frame to the buffer 206.

Figure 3:
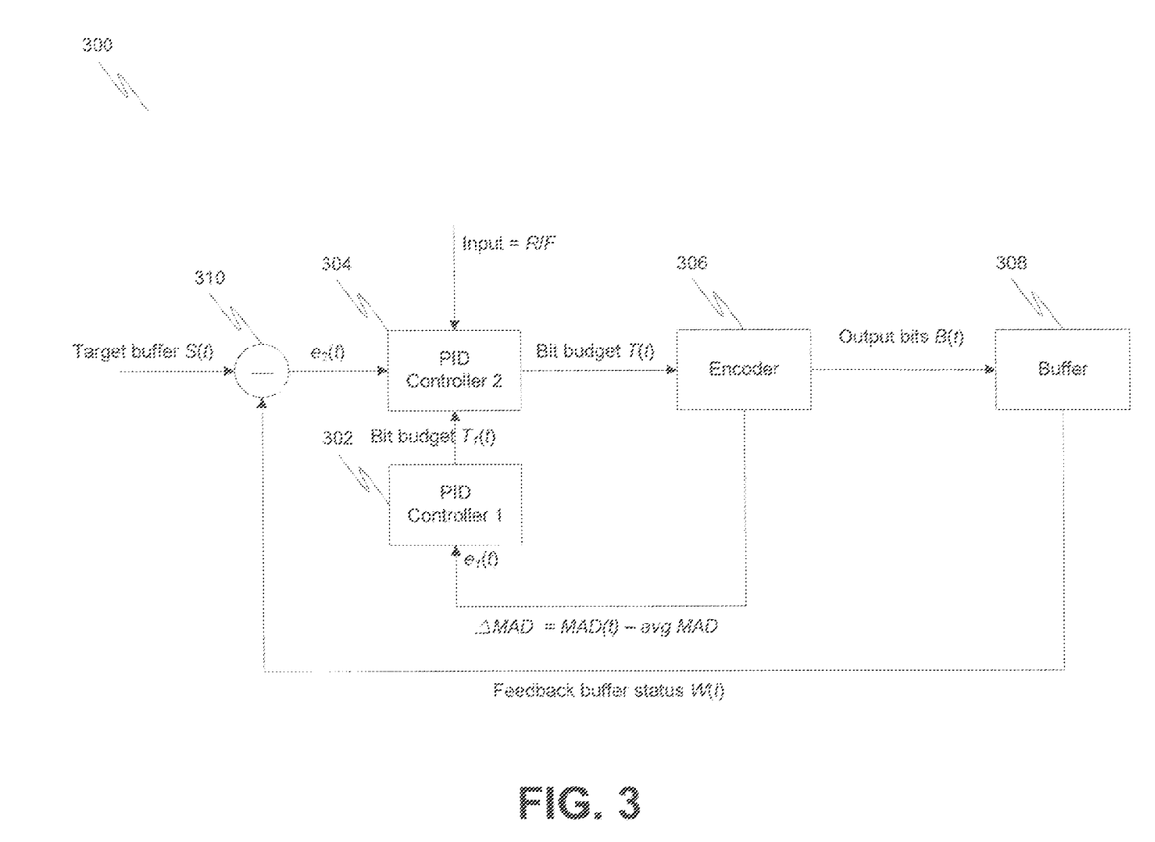
FIG. 3 illustrates an example diagram of dual-PID-controller-based bit allocation and rate control for video coding.

FIG. 3 illustrates at 300 an example diagram of dual-PID-controller-based bit allocation and rate control for video coding. Two PID controllers 302 and 304 are used in connection with a video encoder 306 for bit allocation and rate control. For example, the two PID controllers may be used together to adjust a bit budget for a frame to be encoded in the video encoder 306, based on not only the status of the buffer 308, but also complexity of the frame to be encoded.

The PID controller 302 receives from the video encoder 306 an error signal $e_1(t)$ which represents a complexity measure of the frame to be encoded. The complexity measure of the frame to be encoded may be determined based on a difference ΔMAD between a mean absolute difference of the frame to be encoded, MAD(t), and an average mean absolute difference of frames encoded previously during a predetermined period, avg MAD. MAD(t) indicates the complexity of the frame at time t or the current frame. avg MAD indicates average complexity of the frames encoded previously during the predetermined period. For example, if the predetermined period equals to one second, and the number of the frames encoded during the predetermined period is F, F equals in magnitude, the frame rate during the predetermined period. As an example, avg MAD may be calculated according to the following equation:

$$avgMAD = 1/F \sum_{\tau=t-F}^{t} MAD(\tau),$$

where avg MAD is the average mean absolute difference of the frames encoded previously during the predetermined period, τ is a time index, between t−F and t, of one of the previous frames, MAD(τ) is a mean absolute difference of the previous frame at time τ, and F is the total frame number of the frames encoded previously during the predetermined period.

Then, $e_1(t)$ can be determined according to the following equation:

$$e_1(t) = \Delta MAD(t) = MAD(t) - avgMAD = MAD(t) - 1/F \sum_{\tau=t-F}^{t} MAD(\tau).$$

The PID controller 302 may generate a preliminary bit budget $T_1(t)$ based on the error signal $e_1(t)$ and a bit rate setting that may include a target bit rate (R) in bits per second and a frame rate (F) in frames per second. For example, the preliminary bit budget $T_1(t)$ may be generated according to an equation:

$$T_1(t) = \frac{R}{F}(1 + PID_1) = \frac{R}{F}\left(1 + K_p e_1(t) + K_i \sum_{\tau=0}^{t} e_1(\tau) + K_d[e_1(t) - e_1(t-1)]\right).$$

A target buffer level S(t) and a feedback buffer status W(t) may be received at an arithmetic component 310, such as a comparator, an adder, a subtractor and an adder-subtractor. The feedback buffer status W(t) is updated based on a previous feedback buffer status W(t−1), output bits B(t−1) previously generated from the video encoder 306, and the bit rate setting. For example, W(t) may be updated according to an equation:

$$W(t) = W(t-1) + B(t-1) - R/F.$$

An error signal $e_2(t)$ may be generated at the arithmetic component 310 based on the difference between the target buffer level S(t) and the feedback buffer status W(t). For example, the error signal $e_2(t)$ may be generated according to an equation:

$$e_2(t) = S(t) - W(t).$$

The PID controller 304 receives an input R/F determined from the bit rate setting, the preliminary bit budget $T_1(t)$, and the error signal $e_2(t)$, and generates a final bit budget T(t) based on the bit rate setting, the preliminary bit budget $T_1(t)$, and the error signal $e_2(t)$. For example, the final bit budget T(t) may be generated according to an equation:

$$T(t) = T_1(1 + PID_2) = T_1(t)(1 + K_p e_2(t) + K_i \sum_{\tau=0}^{t} e_2(\tau) + K_d[e_2(t) - e_2(t-1)]).$$

The video encoder 306 uses the final bit budget T(t) to encode the current frame, and generates actual output bits B(t) to the buffer 308.

Figure 4:
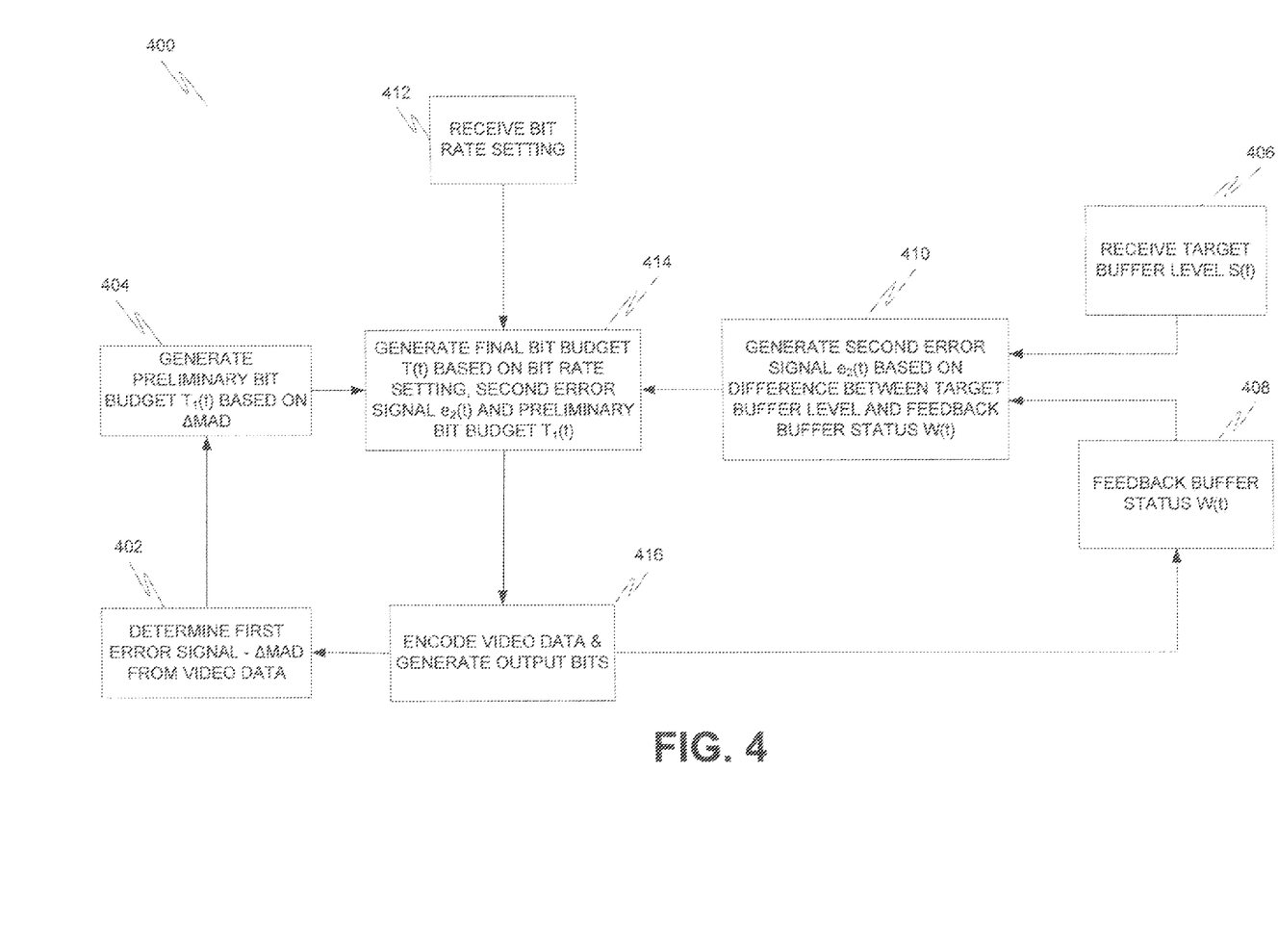
FIG. 4 illustrates an example flow chart of dual-PID-controller-based bit allocation and rate control for video coding.

FIG. 4 illustrates at 400 an example flow chart of dual-PID-controller-based bit allocation and rate control for video coding. A first error signal may be determined at 402 from video data, representing the difference ΔMAD between the complexity of the current frame to be encoded, MAD(t), and the average complexity of frames encoded previously during a predetermined period, avg MAD. At 404, a preliminary bit budget $T_1(t)$ may be generated based on the first error signal, i.e., ΔMAD.

A target buffer level S(t) may be received at 406 and a feedback buffer status W(t) may be received at 408. A second error signal $e_2(t)$ may be generated at 410 based on the difference between the target buffer level S(t) and the feedback buffer status W(t).

A bit rate setting may be received at 412. The bit rate setting may include a target bit rate (R) in bits per second and a frame rate (F) in frames per second. A final bit budget T(t) may be generated at 414 based on the received bit rate setting, the received preliminary bit budget $T_1(t)$, and the received second error signal $e_2(t)$. The final bit budget T(t) may be used at 416 to encode a current frame, and generates output bits for the current frame to a buffer.

A quantization parameter is usually used for video coding. Based on the final bit budget T(t) discussed above, a quantization parameter Q(t) may be derived based on a rate-quantization (R-Q) model from a Video CODEC Test Model, Near-Term, Version 8 (TMN8).

The R-Q model from TMN8 may be expressed in an equation:

$$R = \frac{e}{\ln 2} \frac{\sigma^2}{Q^2}, \qquad (1)$$

where R is a number of bits generated for a frame, σ is a standard deviation, and Q is a quantization parameter.

The complexity of a frame to be encoded, MAD, may be used to replace $\sigma^2$ in equation (1) and yield an equation:

$$\frac{RQ^2}{MAD} = \frac{e}{\ln 2}. \qquad (2)$$

Thus, for a current frame with a complexity MAD(t), and a previous frame with a complexity MAD(t−1), $$\frac{R(t)Q^2(t)}{MAD(t)} \cong \frac{R(t-1)Q^2(t-1)}{MAD(t-1)}. \qquad (3)$$

As an example, it is assumed that for the current frame, the generated bits R(t) are equal to the final bit budget T(t). For the previous frame, the generated bits R(t−1) are assumed to be equal to output bits B(t−1) for the previous frame. Therefore, a quantization parameter Q(t) may be derived from equation (3) for video coding:

$$Q(t) = \sqrt{\frac{B(t-1)Q^2(t-1)MAD(t)}{T(t)MAD(t-1)}}. \qquad (4)$$

The dual-PID-controller-based bit allocation and rate control disclosed herein may be applied to many scenarios with different strategies. Table 1 provides as examples strategies for three different scenarios. The dual-PID-controller-based bit allocation and rate control disclosed herein may be applied with/without one or more of the following mechanisms: buffer overflow, maximum bit rate constraint, and big motion frame skipping.

TABLE 1

| Scenarios | Strategies | No. |
|---|---|---|
| File Compressing | Applying dual-PID-controller-based bit allocation and rate control without buffer overflow, maximum bit rate constraint, or big motion frame skipping | 1 |
| Video Recording (Camcorder) | Applying dual-PID-controller-based bit allocation and rate control with big motion frame skipping (1/3 ratio limitation) | 2 |
| Video Telephony | Applying dual-PID-controller-based bit allocation and rate control with buffer overflow, maximum bit rate constraint, and big motion frame skipping (1/2 ration limitation) | 3 |

Table 2 illustrates example performance data from applying the dual-PID-controller-based bit allocation and rate control disclosed herein to three different streams, compared with the performance data of a TMN8 rate control applied to the same three streams. The dual-PID-controller-based bit allocation and rate control disclosed herein, applied with the strategies noted in Table 1, can achieve higher output bit rate, and better average peak signal-to-noise ratio (PSNR) that indicates better video quality.

TABLE 2

| stream | rate control strategy | output bitrate (kbps) | skip frame/ total frame | average PSNR (exclude skipped frame) | PSNR gain compared to TMN8 |
|---|---|---|---|---|---|
| bigMotionCif420.yuv | TMN8 | 519.51 | 0/352 | 34.53 | N/A |
| | Strategy 1 | 519.76 | 0/352 | 35.53 | 1.00 |
| | Strategy 2 | 552.08 | 53/352 | 36.83 | 2.30 |
| | Strategy 3 | 557.07 | 62/352 | 37.14 | 2.61 |
| smoothmov.yuv | TMN8 | 515.05 | 0/214 | 36.30 | N/A |
| | Strategy 1 | 521.52 | 0/214 | 37.33 | 1.03 |
| | Strategy 2 | 524.32 | 1/214 | 37.43 | 1.13 |
| | Strategy 3 | 525.34 | 2/214 | 37.46 | 1.16 |
| foreman_cif.yuv | TMN8 | 513.46 | 0/300 | 33.05 | N/A |
| | Strategy 1 | 516.35 | 0/300 | 33.77 | 0.72 |
| | Strategy 2 | 516.35 | 0/300 | 33.77 | 0.72 |
| | Strategy 3 | 516.35 | 0/300 | 33.77 | 0.72 |

Figure 5:
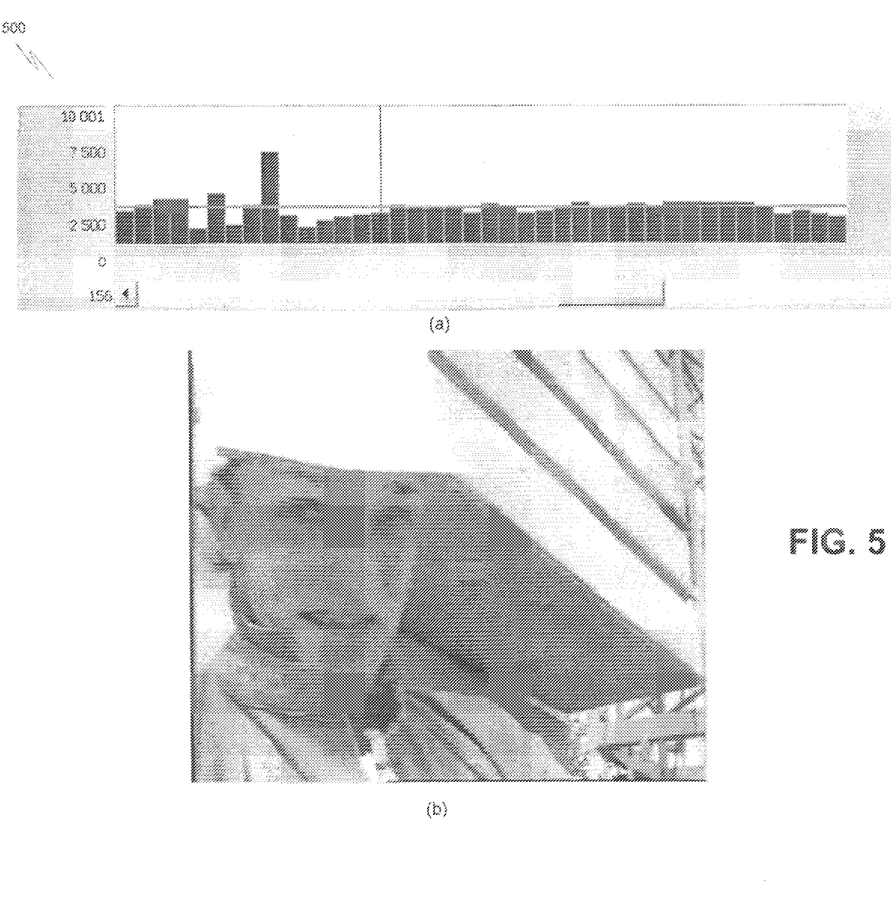
FIG. 5 illustrates example performance data from applying the dual-PID-controller-based bit allocation and rate control to a foreman sequence.
Figure 6:
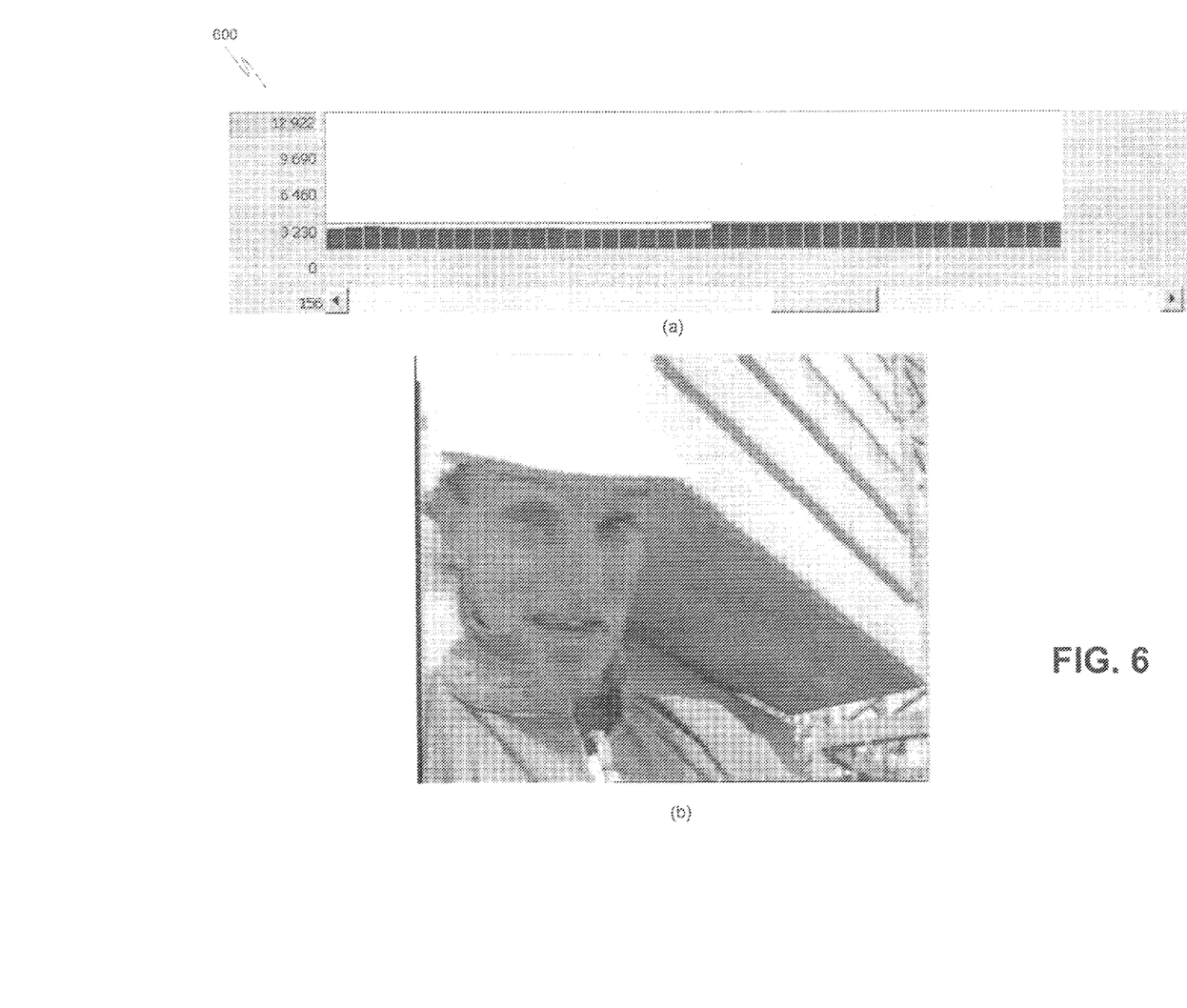
FIG. 6 illustrates example performance data from applying a TMN8 rate control strategy to the foreman sequence.

FIG. 5 illustrates example performance data from applying the dual-PID-controller-based bit allocation and rate control to a foreman sequence. FIG. 5(a) shows output bits for frames in the foreman sequence, and FIG. 5(b) shows output image of the 173th frame in the foreman sequence. As a comparison, FIG. 6 illustrates example performance data from applying a TMN8 rate control strategy to the foreman sequence. As shown in FIG. 5(a), the output bits varies according to the complexity of the frames in the foreman sequence using the dual-PID-controller-based bit allocation and rate control. In contrast, as shown in FIG. 6(a), the output bits does not vary much over the frames using the TMN8 rate control. Moreover, comparing FIG. 5(b) with FIG. 6(b) shows the dual-PID-controller-based bit allocation and rate control yields better image quality than the TMN8 rate control.

Figure 7:
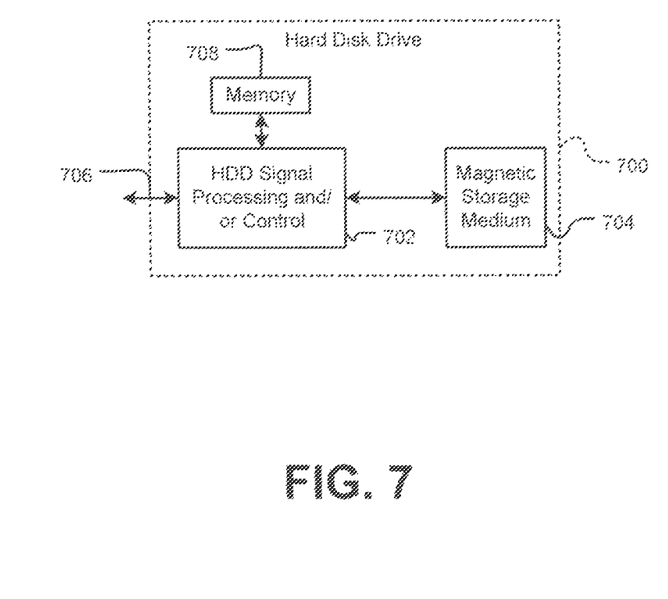
FIGS. 7-9 illustrate various exemplary implementations of the dual-PID-controller-based bit allocation and rate control.
Figure 8:
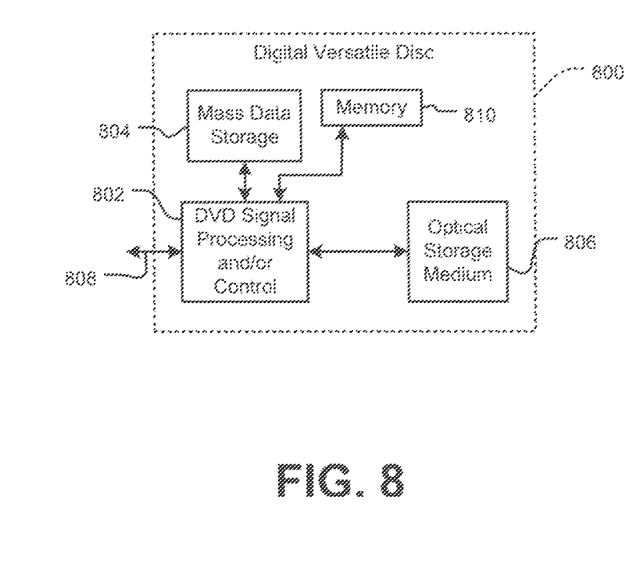
Figure 9:
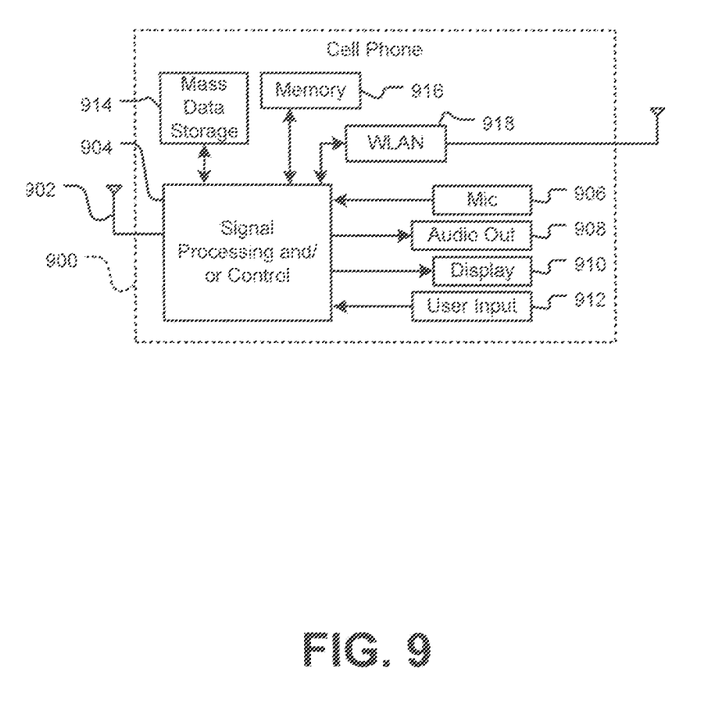

Referring now to FIGS. 7-9, various exemplary implementations of the dual-PID-controller-based bit allocation and rate control are shown. Referring to FIG. 7, the dual-PID-controller-based bit allocation and rate control may be embodied in a hard disk drive 700. The dual-PID-controller-based bit allocation and rate control may implement either or both signal processing and/or control circuits, which are generally identified in FIG. 7 at 702. In some implementations, signal processing and/or control circuit 702 and/or other circuits (not shown) in HDD 700 may process data, perform coding and/or encryption, perform calculations, and/or format data that is output to and/or received from a magnetic storage medium 704.

HDD 700 may communicate with a host device (not shown) such as a computer, mobile computing devices such as personal digital assistants, cellular phones, media or MP3 players and the like, and/or other devices via one or more wired or wireless communication links 706. HDD 700 may be connected to memory 708, such as random access memory (RAM), a low latency nonvolatile memory such as flash memory, read only memory (ROM) and/or other suitable electronic data storage.

Referring now to FIG. 8, the dual-PID-controller-based bit allocation and rate control may be embodied in a digital versatile disc (DVD) drive 800. The dual-PID-controller-based bit allocation and rate control may implement either or both signal processing and/or control circuits, which are generally identified in FIG. 8 at 802, and/or mass data storage 804 of DVD drive 800. Signal processing and/or control circuit 802 and/or other circuits (not shown) in DVD 800 may process data, perform coding and/or encryption, perform calculations, and/or format data that is read from and/or data written to an optical storage medium 806. In some implementations, signal processing and/or control circuit 802 and/or other circuits (not shown) in DVD 800 can also perform other functions such as encoding and/or decoding and/or any other signal processing functions associated with a DVD drive.

DVD drive 800 may communicate with an output device (not shown) such as a computer, television or other device via one or more wired or wireless communication links 808. DVD 800 may communicate with mass data storage 804 that stores data in a nonvolatile manner. Mass data storage 804 may include a hard disk drive (HDD) such as that shown in FIG. 7. The HDD may be a mini HDD that includes one or more platters having a diameter that is smaller than approximately 1.8". DVD 800 may be connected to memory 810, such as RAM, ROM, low latency nonvolatile memory such as flash memory, and/or other suitable electronic data storage.

Referring now to FIG. 9, the dual-PID-controller-based bit allocation and rate control may be embodied in a cellular phone 900 that may include a cellular antenna 902. The dual- PID-controller-based bit allocation and rate control may implement either or both signal processing and/or control circuits, which are generally identified in FIG. 9 at 904, a WLAN interface and/or mass data storage of the cellular phone 900. In some implementations, cellular phone 900 includes a microphone 906, an audio output 908 such as a speaker and/or audio output jack, a display 910 and/or an input device 912 such as a keypad, pointing device, voice actuation and/or other input device. Signal processing and/or control circuits 902 and/or other circuits (not shown) in cellular phone 900 may process data, perform coding and/or encryption, perform calculations, format data and/or perform other cellular phone functions.

Cellular phone 900 may communicate with mass data storage 914 that stores data in a nonvolatile manner such as optical and/or magnetic storage devices for example hard disk drives HDD and/or DVDs. At least one HDD may have the configuration shown in FIG. 7 and/or at least one DVD may have the configuration shown in FIG. 8. The HDD may be a mini HDD that includes one or more platters having a diameter that is smaller than approximately 1.8". Cellular phone 900 may be connected to memory 916 such as RAM, ROM, low latency nonvolatile memory such as flash memory and/or other suitable electronic data storage. Cellular phone 900 also may support connections with a WLAN via a WLAN network interface 918.

This written description uses examples to disclose the invention, include the best mode, and also to enable a person skilled in the art to make and use the invention. The patentable scope of the invention may include other examples that occur to those skilled in the art.

As an example, systems and methods can be configured as disclosed herein to be used for various video encoders, such as H.263/MPEG-4, and H.264. As another example, systems and methods can be configured as disclosed herein to be applied in many different scenarios, such as file compressing, transcoding, camcorder and video telephony. As another example, systems and methods can be configured as disclosed herein for achieving improvements of video quality, as well as bit rate control. As another example, systems and methods can be configured as disclosed herein for applications that introduce low computation and memory costs for encoders.

It is claimed:

1. A non-transitory computer-readable storage medium comprising programming instructions for causing a processing system to perform a method for encoding video frames of a video stream using proportional-integral-derivative (PID) controllers, the method comprising:
   (i) generating, for each of the video frames, a first difference $e_1(t)$ for time t based on $$e_1(t) = MAD(t) - avgMAD,$$

wherein
   MAD(t) is a mean absolute difference of a respective frame at time t, and
   avg MAD is an average of mean absolute differences of previous frames;
   (ii) generating, by a first PID controller, a preliminary bit budget $T_i(t)$ for a frame at time t as a PID function of $e_1(t)$, wherein the PID function of $e_1(t)$ includes a summation of (i) a first term proportional to $e_1(t)$, (ii) a second term representing an summation of $e_1(t)$, and (iii) a third term representing a difference of $e_1(t)$, based on $$T_1(t) = \frac{R}{F}\left(1 + K_p e_1(t) + K_i \sum_{\tau=0}^{t} e_1(\tau) + K_d[e_1(t) - e_1(t-1)]\right),$$

wherein
   $K_p$, $K_i$ and $K_d$ are constants for calculating $T_1(t)$,
   R is target bit rate, and
   F is frame rate; and
   (iii) generating a second difference $e_2(t)$ for time t based on $$e_2(t) = S(t) - W(t)$$

wherein
   S(t) is a target buffer level at time t for a buffer, and
   W(t) is feedback buffer status at time for the buffer, and
   (iv) generating, by a second PID controller, a final bit budget T(t) that is proportional to the preliminary bit budget and to a PID function of $e_2(t)$, wherein the PID function of $e_2(t)$ includes a summation of (i) a first term proportional to $e_2(t)$, (ii) a second term representing a summation of $e_2(t)$, and (iii) a third term representing a difference of $e_2(t)$, based on $$T(t) = T_1(t)(1 + K_p e_2(t) + K_i \Sigma_{\tau=0}^{t} e_2(\tau) + K_d[e_2(t) - e_2(t-1)]),$$

wherein
   $K_p$, $K_i$ and $K_d$ are constants for calculating $T_1$; and
   (v) providing the final bit budget T(t) to a video encoder for the video encoder to encode the video frame based on the final bit budget T(t) to generate output bits, for the video frame, to the buffer;
   whereby the first and second PID controllers function together to adjust the bit budget for the video frames based on both status of the buffer as represented by W(t) and complexity of the video frames as represented by MAD and avg MAD.

2. The non transitory computer-readable storage medium of claim 1, wherein the programming instructions are configured to be executed by the one or more processors to calculate a quantization parameter Q(t) for the current frame based on the equation $$Q(t) = Q(t-1)\frac{B(t-1)MAD(t)^i}{T(t)MAD(t-1)}$$

wherein Q(t−1) is the quantization parameter for the previous frame, B(t−1) represents output bits for the previous frame, t is a number, and MAD(t) and MAD(t−1) are MADs of the current frame and the previous frame respectively.

3. A method for encoding video frames of a video stream using proportional-integral-derivative (PID) controllers, the method comprising:
   (i) generating, for each of the video frames, a first difference $e_1(t)$ for time t based on $$e_1(t) = MAD(t) - avgMAD,$$

wherein
   MAD(t) is a mean absolute difference of a respective frame at time t, and
   avg MAD is an average of mean absolute differences of previous frames;
   (ii) generating, by a first PID controller, a preliminary bit budget $T_1(t)$ for a frame at time t as a PID function of $e_1(t)$, wherein the PID function of $e_1(t)$ includes a summation of (i) a first term proportional to $e_1(t)$, (ii) a second term representing an summation of $e_1(t)$, and (iii) a third term representing a difference of $e_1(t)$, based on $$T_1(t) = \frac{R}{F}\left(1 + K_p e_1(t) + K_i \sum_{\tau=0}^{t} e_1(\tau) + K_d[e_1(t) - e_1(t-1)]\right),$$

wherein $K_p$, $K_i$ and $K_d$ are constants for calculating $T_i(t)$,
R is target bit rate, and
F is frame rate; and (iii) generating a second difference $e_2(t)$ for time t based on $$e_2(t) = S(t) - W(t)$$

wherein

S(t) is a target buffer level at time t for a buffer, and
W(t) is feedback buffer status at time for the buffer, and (iv) generating, by a second PID controller, a final bit budget T(t) that is proportional to the preliminary bit budget and to a PID function of $e_2(t)$, wherein the PID function of $e_2(t)$ includes a summation of (i) a first term proportional to $e_2(t)$, (ii) a second term representing a summation of $e_2(t)$, and (iii) a third term representing a difference of $e_2(t)$, based on $$T(t) = T_1(t)(1 + K_p e_2(t) + K_i \Sigma_{\tau=0}^{t} e_2(\tau) + K_d[e_2(t) - e_2(t-1)]),$$

wherein $K_p$, $K_i$ and $K_d$ are constants for calculating $T_1$; and (v) providing the final bit budget T(t) to a video encoder for the video encoder to encode the video frame based on the final bit budget T(t) to generate output bits, for the video frame, to the buffer;

whereby the first and second PID controllers function together to adjust the bit budget for the video frames based on both status of the buffer as represented by W(t) and complexity of the video frames as represented by MAD and avg MAD.

4. The method of claim 3, further comprising:

calculating a quantization parameter Q(t) for the current frame based on the equation:

$$Q(t) = Q(t-1)\left[\frac{B(t-1)MAD(t)}{T(t)MAD(t-1)}\right]^i$$

wherein Q(t−1) is the quantization parameter for the previous frame, B(t−1) represents output bits for the previous frame, i is a number, and MAD(t) and MAD(t−1) are MADs of the current frame and the previous frame respectively.

\* \* \* \* \*